United States Patent Office

3,117,901
Patented Jan. 14, 1964

3,117,901
ARTICLE METHOD AND COMPOSITION
Vaughan Crandall Chambers, Jr., Fair Haven, N.J., assignor to E. I. du Pont de Nemours and Company, Wilmington, Del., a corporation of Delaware
No Drawing. Filed Mar. 3, 1958, Ser. No. 718,410
4 Claims. (Cl. 156—157)

This invention relates to novel adhesive compositions, and to methods and articles utilizing them.

Film splicing has been a problem in the motion picture industry for many years. It is known to use as splicing cements for motion picture film adhesive compositions in suitable solvents, relying on solvent action to make a strong splice.

The splicing problem has become more acute with the introduction of polymeric polyester photographic film base, such as biaxilly oriented ethylene gylcol/terephthalic acid polyester. Such polyesters, because of their chemical inertness, are not attacked by common solvents suitable for making cement and as a result cannot be spliced effectively by conventional solvent splicing cements. When a solvent does attack the polyester, the polyester film base becomes brittle and the splice breaks easily.

A strong splice is an essential for satisfactory motion picture film. While in use in a projector, motion picture film is under stress due to the heating and cooling conditions and projector tensions. What has been needed is a splicing adhesive composition having strong adhesive qualities not dependent on its solvent properties to make strong splices.

An object of the present invention is to provide a novel adhesive composition useful in the splicing of motion picture film. Another object is to provide such a composition strongly adherent to films of polyesters, such as polyethylene terephthalate, and additionally to other film materials, such as cellulose acetate, cellulose triacetate, cellulose nitrate, polystyrene, etc., as well as other film layer materials, including gelatin, polyvinyl alcohol, etc. Yet another object is to provide such a composition useful in laminating flexible web materials and adhering plastics to other plastics or to metals.

An important object is to provide a film splicing adhesive which is non-toxic and which is in convenient form for the splicing of cine film. A specific object is to provide an adhesive composition adherent to polyester photographic film base. Another specific object is to provide such an adhesive which is adherent to light-sensitive silver halide photographic emulsions, including gelatinous emulsions, without deleteriously affecting the light-sensitive photographic properties of the emulsion. A further object is to provide such an adhesive composition in the form of conveniently shaped articles of manufacture, and to provide novel laminar structures utilizing such adhesive compositions. Still other objects will be apparent from the following description of the invention.

I have found that the requirements of a satisfactory splicing adhesive in the motion picture industry are satisfied, I believe for the first time, by the novel adhesives of the present invention, which comprise as an essential ingredient a linear copolyester corresponding to the esterification product of (1) hexahydroterephthalic acid in an amount within the range from 10 to 90 mole percent of the copolyester, (2) a saturated aliphatic dicarboxylic acid represented by the formula $HOOC(CH_2)_nCOOH$ where $n$ is an integer from 4 through 8 inclusive, in an amount within the range from 5 to 45 mole percent of the copolyester, (3) an aromatic dicarboxylic acid from the group consisting of terephthalic acid and isophthalic acid, in an amount within the range from 5 to 45 mole percent of the copolyester, and (4) a glycol (a saturated aliphatic dihydric alcohol) having from 2 to 10 carbon atoms and 0 to 4 oxygen atoms in addition to the hydroxyl groups. Preferably, the copolyester will contain equal proportions of components (2) and (3).

With the above essential copolyester ingredient in the compositions according to this invention can be admixed other thermoplastic polymeric materials, cross linking agents, solvents, fillers, and plasticizers, as will be more fully explained hereinafter. The essential copolyester ingredient must be present in an amount of at least about 20% by weight based on the total weight of the copolyester and other thermoplastic polymeric materials in the adhesive composition.

The copolyester which forms the essential component of the adhesive composition according to this invention can be prepared in accordance with known procedures and techniques, for example, as disclosed in Whinfield et al U.S. 2,465,319, Snyder U.S. 2,623,031 and Snyder U.S. 2,623,033, by the alcoholysis with the suitable glycol of an admixture of dialkyl (for example, dimethyl) esters of the three acid components. The reaction is preferably carried out in the presence of one or more esterification catalysts. I have found a particularly preferred combination of catalysts includes calcium acetate, antimony trioxide, and zinc borate, to obtain an extremely high molecular weight polymeric material. The dialkyl hexahydroterephthalate can be conveniently prepared by the hydrogenation of dialkyl terephthalate over Raney nickel.

As disclosed in the prior art patents referred to above, the alcoholysis reaction comprises heating the alkyl esters of the respective acids in the liquid state at atmospheric pressure and at a temperature of from 155° C. to 240° C. together with preferably an excess of the dihydric alcohol reactant, and preferably from 1.5 to 2.5 moles of the dihydric alcohol reactant per mole of dialkyl ester, in the presence of the selected catalyst or combination of catalysts. Methanol is liberated during the ester interchange reaction. After the evolution of methanol is complete, heating of the resulting monomeric bis-dihydric alcohol esters is continued in a melt polymerization process under reduced pressure, such as from 0.5 millimeter to 2 millimeters of mercury at an increased temperature, such as from about 240° C. to about 280° C., with agitation until the resulting copolyester has the desired viscosity.

When prepared according to the above described method, the resultant polymeric composition has excellent properties as an adhesive and is immediately useful as such.

I have furthermore found that the physical properties of the above described novel copolyester compositions can be advantageously modified by the inclusion therein of suitable amounts of other thermoplastic polymers, including phenol/formaldehyde resins, e.g., p-phenylphenol/formaldehyde resin and butylphenol/formaldehyde resin, coumarone/indene resins, and arylsulfonamide/formaldehyde resins. Preferably resins will be used that will not impart color or turbidity to the adhesive, but will allow it to remain clear, transparent and colorless. Upon admixture of the copolyester component with one or more such polymeric resins, the resulting thermoplastic compositions are particularly useful in the forms described below.

The adhesive compositions according to this invention can be in the form of (A) the highly viscous thermoplastic mass produced as described above, with or without the presence of the additional polymer as described above, or it can be advantageously used in the form of (B) a liquid adhesive containing a suitable solvent, (C) a monofilament, multifilament (such as a yarn or thread), or ribbon which, if desired, can have a surface coating of a suitable non-tacking material, or (D) as the adhesive layer or layers of an adhesive tape.

In making a splice or other lamination of two overlapping films using the adhesives of this invention, which can be in monofilament or ribbon form, the adhesive is placed between the two surfaces to be spliced, and the adhesive then heated from 2 to about 15 seconds at a temperature within the range from about 140° C. to about 175° C. under sufficient pressure to distribute the adhesive, for example, 100 pounds per square inch, thus forming a strong non-slipping splice. When the adhesive is utilized in tape form (D), the splicing procedure described above is also applicable. As demonstrated in the examples below, satisfactory splices can be readily obtained using resistance heating and dielectric heating methods.

When in the form of (B) a liquid adhesive, the adhesive composition of this invention comprises a solution of the thermoplastic polymeric materials of the adhesive in solution in a suitable solvent. The solvent will preferably be non-flammable and non-toxic, and have a boiling point below 100° C. The amount of solvent can be in the the range from 10% to 70%, and preferably about 50%, by weight, based on the weight of the thermoplastic polymeric material present.

In a preferred embodiment of the liquid adhesive, the composition comprises about a 60% solution in methylene chloride of a mixture which is (1) 65% by weight of the copolyester of ethylene glycol and hexahydroterephthalic acid (20 mole percent), sebacic acid (40 mole percent) and terephthalic acid (40 mole percent), and (2) 35% by weight of a non-heat hardening p-phenylphenol/formaldehyde resin. One suitable resin of this type is designated as CKR–5254 by its manufacturer, the Bakelite Division of Union Carbide and Carbon Company.

In another embodiment of the composition of this invention, the adhesive is in the form of (C) a thin thread, monofilament or ribbon and comprises preferably about 75% of the copolyester described in the preceding paragraph and about 25% of added polymer, of which the preferred is the just-mentioned non-heat hardening p-phenylphenol/formaldehyde resin. Such a monofilament or ribbon can be formed conveniently by extrusion or other suitable methods and is preferably coated, according to known procedures, with a thin surface layer of a non-tacking copolymer of vinylidene chloride (83% by weight), methyl acrylate (15% by weight), and itaconic acid (2% by weight), to prevent sticking of the monofilament or ribbon as it is wound on spools.

When the adhesive composition is to be utilized in the form of (D) a tape as referred to above, the acid ingredients in the copolyester are preferably in a proportion of 80 mole percent of the hexahydroterephthalic acid component and 10 mole percent of each of the other two acid components. A tape can be readily made by taking a film of a suitable thin flexible web, such as an oriented polyethylene terephthalate, which because of its strength can be as thin as one mil or less, which has been coated if desired with an adhesion promoting material, such as a 5 to 10% solution of a diisocyanate in a suitable solvent such as methylene chloride, and coating on the tape, or on such coating of adhesion promoting material if present, a layer of the adhesive of this invention in a thickness of about one mil. The adhesive composition can be coated on one or both sides of the flexible support. The adhesive can be conveniently coated from solvent solution and the solvent subsequently dried, as will be readily understood.

When the adhesive in the form of a tape is to be used in conjunction with a dielectric splicing mechanism, the copolyester preferably contains hexahydroterephthalic acid in an amount of about 20 mole percent, and the other two acid components of the copolyester each in an amount of about 40 mole percent. The composition also contains preferably about 25% by weight, based on the total weight of the thermoplastic polymeric components, of the non-heat hardening p-phenylphenol/formaldehyde resin mentioned above. In addition, the adhesive composition preferably contains, in an amount of up to about 30% by weight of the total weight of the thermoplastic polymeric components as a non-slipping agent finely divided silica having an average particle size of about 10 to 20 millimicrons in diameter.

The invention will be further explained but is not intended to be limited by the following examples:

EXAMPLE 1

An adhesive composition according to this invention was prepared as follows:

The copolyester which formed the essential part of the adhesive was prepared in a 500 ml. three-necked flask fitted with stainless steel anchor stirrer, nitrogen inlet tube and 10 inch Vigreaux column with receiver, drying tube and thermometer. The following materials in the quantities indicated were placed in the flask: dimethyl hexahydroterephthalate 32.0 g. (0.16 mole), dimethyl sebacate 73.5 g. (0.32 mole), dimethyl terephthalate 62.0 g. (0.32 mole), ethylene glycol 148.0 g. (2.4 moles), calcium acetate 0.12 g., antimony trioxide 0.08 g., and zinc borate 0.045 g.

The mixture was flushed with nitrogen with stirring and heated in an oil bath for 5 hours at 200° C., distilling off methanol. The oil bath temperature was slowly raised to 220° C. over a period of 0.5 hour during which time additional methanol was obtained. The oil bath temperature was then raised to 255–260° C. and the glycol distilled from the reaction vessel. After 2 hours the pressure was reduced to 0.7–0.3 mm. and the stirrer speed was increased to 600 r.p.m. Stirring became difficult after several hours and finally after 3 hours at this temperature and pressure the reaction was stopped. The final adhesive product was a tough brown-green rubbery solid with an inherent viscosity of 0.65.

To prepare the monofilament form of the adhesive, the copolyester was dissolved in methylene chloride and the solution filtered through nainsook. The dry polymers for extrusion were obtained by casting the solution on a Teflon polytetrafluoroethylene resin-coated steam plate at 100° C. When evaporation of the solvent was complete the solid adhesive residue was stripped from the plate and dried in vacuo at a pressure of less than 1 mm. absolute for 1 hour at 80–90° C. The adhesive film was extruded through a circular orifice having a diameter of 10 mils into a nitrogen atmosphere under high pressure of about 7,000 p.s.i. at a temperature below 150° C.

The adhesive monofilament was rolled on a spool and positioned by guides attached to a modified splicing instrument used in the industry. In addition to the guides and spool the instrument was modified by adding electrical resistance heated bars in the shear plates which had 0.1 x 1.4 inch heating surfaces. The heater bars gave temperature readings of 175° C. at the center of the splice and 150° C. at the edges of the film. A uniform pressure of 140 p.s.i. was maintained. Two unscraped photographic films made as described in Alles et al. U.S. 2,698,239, and having as a bottom layer a film base of a biaxially stretched ethylene glycol/terephthalic acid polyester and a top layer of a light-sensitive gelatino-silver iodobromide emulsion, were positioned with a 0.072 inch overlap and the filament drawn between the overlapped ends across the splice area with the assistance of the guides. The splicer was closed and the splice heated for 10 seconds. After cooling, the spliced film was ready for use. The lapped joint had the polyester film base of one film end firmly adhered by the adhesive composition to the gelatino-silver halide emulsion of the other film end.

Peel strength tests at 50 and 75° F. were performed to determine the load value that would cause the film to break at the splice. The splice was prepared so that the film strips overlapped along their whole length but adhesive was applied only at one end over an area 1.375 inch by 0.072 inch. The test values were determined using the Instron tensile testing machine manufactured by the Instron Engineering Corporation of Quincy, Massachusetts. According to test procedures reported in Trans, ASME, 71, 789–96, October 1949. As the weight load increased, the overlapped films peeled apart. At 50° F. the peel strength was 8.9 pounds and at 75° F. 4.1 pounds.

Creep resistance tests were also performed. This test determined the time required to break the splice by the exertion of a constant 2,000 gm. tensile load on the splice at 122° F. and at a relative humidity less than 10%. Splices were aged at test conditions for at least 30 minutes before testing. At 122° F. the creep resistance time was 0.8 minutes.

All of these tests demonstrated that a satisfactory splice was obtained.

EXAMPLE 2

Four adhesive compositions were prepared by mixing the copolyester described in Example 1, with an adjuvant p-phenylphenol/formaldehyde non-heat hardening resin sold as CKR–5254 by the Bakelite Division, Union Carbide and Carbon Corporation, and having a melting point of 195–225° F. as determined by the ball and ring test. The resin was used in the proportions by weight as shown in Table I. The adhesive compositions obtained were formed into threads, applied to the two unscraped polyethylene terephthalate photographic films and tested in the same manner as described in Example 1. The following results were obtained:

*Table I*

| Copolyester,[1] percent by weight | Adjuvant,[1] percent by weight | 75°F. Peel Strength (lb.) | 50°F. Peel Strength (lb.) | 122°F. Creep Resistance (min.) |
|---|---|---|---|---|
| 85 | 15 | 5.1 | 10.3 | 0.7 |
| 75 | 25 | 12.5 | 9.4 | 0.4 |
| 65 | 35 | 20.2 | 2.6 | 2.8 |
| 55 | 45 | 3.9 | 0.5 | 4.9 |

[1] Based on total weight of copolyester plus adjuvant.

EXAMPLE 3

Three adhesive composition filaments prepared as indicated in Examples 1 and 2 were given a thin surface coating of an aqueous suspension (50% solids) of vinylidene chloride (83.0%), methyl acrylate (15.0%), itaconic acid (2.0%) polymer, prepared as described in Swindells U.S. 2,698,235, to prevent sticking in the wound spools. The splices were made and tested as described in Example 1. Table II indicates the composition proportions and the results obtained:

*Table II*

| Copolyester,[1] percent by weight | Adjuvant,[1] percent by weight | 75°F. Peel Strength (lb.) | 50°F. Peel Strength (lb.) | 122°F. Creep Resistance (min.) |
|---|---|---|---|---|
| 100 | 0 | 4.6 | 8.7 | 0.4 |
| 70 | 30 | 8.1 | 1.6 | 2.6 |
| 65 | 35 | 10.0 | 1.0 | 3.3 |

[1] Based on total wieght of copolyester plus adjuvant.

EXAMPLE 4

To 75% by weight of a copolyester prepared in the same manner as indicated in Example 1, except that the final reduced pressure stirring step took 7 hours and the inherent viscosity was 0.84, was added 25% by weight of the p-phenylphenol/formaldehyde non-heat hardening resin as described in Example 2. The adhesive composition was formed into a filament, given a surface coating as described in Example 3 and tested as described in Example 1. The peel strength at 75° and 50° F. were 15.9 and 3.8 pounds respectively. The creep resistance at 122° F. was 7.6 minutes.

EXAMPLE 5

An adhesive of copolyester was formed by the reaction of ethylene glycol, dimethyl hexahydroterephthalate, dimethyl sebacate and dimethyl terephthalate, as indicated in Example 1 but in a mole ratio of 8:1:1 respectively, together with 0.30 g. of calcium acetate and 0.10 g. antimony trioxide as catalyst. A film of oriented polyethylene terephthalate, 1 mil thick, was coated on both sides with a 5% solution of bis(p-isocyanatophenyl)-methane in methylene chloride. Tri-n-butyl amine (0.3% of total weight of solids) and bis(p-isocyanatophenyl)methane (1% of total weight of solids) were added to a solution of the copolyester (28% solids) in methylene chloride. The treated polyethylene terephthalate film was then coated on both sides to a dry thickness of 1.0–1.5 mils with the copolyester solution and dried for ten minutes at 160° F. in hot air moving at 64 cu. ft./min. The coated film was cured for at least 6 days at room temperature.

Five splices were prepared by cutting the adhesive covered polyethylene terephthalate to fit a 0.1 inch by 1.375 inch overlap area, making a "sandwich" between two unscraped polyethylene terephthalate photographic films and heating for 5 seconds in a splicing device having two ¼ inch wide, 10 inch long heater bars mounted one above the other and heated so that a thermocouple between the bars indicated a temperature of 140° C. A fifteen pound weight was placed on the top bar to supply pressure.

Peel strength tests were performed in the manner indicated in Example 1. Tensile strength tests also were performed to determine the force in pounds necessary to break the splice under a tensile load along the length of the film. The tensile load was determined by a Scott "Tensilgraph" sold by Scott Testers, Inc., Providence, Rhode Island. The creep resistance at 122° F. was 3.3 minutes. Additional results shown in Table III were obtained at the temperatures indicated:

*Table III*

| Temperature (° F.) | Peel Strength (lb.) | Tensile Strength (lb.) |
|---|---|---|
| 50 | 3.2 | 66 |
| 68 | 4.2 | 57 |
| 86 | 5.2 | 46 |
| 104 | 4.4 | 40 |
| 122 | 3.0 | 36 |

EXAMPLE 6

An adhesive comprising 65% by weight of the copolyester described in Example 1 and 35% by weight of the non-heat hardening p-phenylphenol/formaldehyde resin described in Example 2 was dissolved in methylene chloride to form a 60% solution of the adhesive. The adhesive solution was applied from a collapsible tube to the ends of two unscraped photographic films having bases of polyethylene terephthalate. The adhesive was spread on each film end to a uniform thickness by means of a doctor stick and was then heated for eight seconds at 175° C. with the two films apart to remove the solvent. Finally, with the films positioned with a 1.375 inch by 0.072 inch overlap in the splicing instrument described in Example 1, the splice area was heated for two seconds at 175° C. to complete the splice. Peel strength tests were conducted in the manner indicated in Example 1 at 50° and 75° F. The peel strength at 50° F. was 1 pound and at 75° F. 10 pounds. The creep resistance test was conducted as indicated in Example 1. The result was a creep resistance at 122° F. of 1.5 minutes.

EXAMPLE 7

A copolyester was formed by the reaction of ethylene glycol and dimethyl hexahydroterephthalate, dimethyl sebacate and dimethyl terephthalate as indicated in Example 1 but in the mole ratio of 8:1:1 respectively.

The adhesive materials were dissolved in methylene chloride (25% solids). The resultant solution was applied and a splice made as described in Example 6 while positioned with a 0.072 inch overlap in the modified splicer described in Example 1. Tensile strength, peel strength, and creep resistance were determined as previously described with the following results: 46 pounds, 3.7 pounds and 0.34 minute respectively. The effects of added resins including coumarone/indene (having a molecular weight of 800–1000, melting point 99–107° C., specific gravity at 15.5° C. of 1.130 and an iodine number of 43, derived from p-coumarone and indene from the oils recovered from coke ovens and sold by the Barrett Division, Allied Chemical and Dye Corporation), hard arylsulfonamide/formaldehyde (which softens at 62° C. but is brittle at normal temperature, has a refractive index of 1.4280–1.4310 and is sold by the Monsanto Chemical Corporation), liquid arylsulfonamide/formaldehyde (which flows freely above 20° C., is mixed with a 20% by weight quantity of n-butyl acetate and is sold by the Monsanto Chemical Corporaton) and epoxide resins (having a specific gravity at 23° C. of 1.16–1.18, a viscosity at 23° C. of 20,000–40,000 cps. and a flash point of 249° C. and sold by Ciba Company Inc.) were determined. The results obtained are indicated in Table IV.

Table IV

| Resin Adjuvants,[1] percent by weight | Percent Total Solids in the Solution | 75° F. Peel Strength (lb.) | 75° F. Tensile Strength (lb.) | 122° F. Creep Resistance (min.) |
|---|---|---|---|---|
| Coumarone/indene (50%) | 25 | 9.0 | 73 | 3.4 |
| Arylsulfonamide/formaldehyde (50%) | 25 | 7.9 | 63 | 0.5 |
| Arylsulfonamide/formaldehyde (50%) | 30 | 7.7 | 56 | 0.3 |
| Coumarone/indene (33%); epoxide resin (33%); ethanolamine (1.0%) | 24 | 3.3 | 59 | 8.4 |

[1] Based on total weight of the solids.

EXAMPLE 8

Three additional adhesive compositions were prepared by mixing the copolyester described in Example 7 with, respectively, the coumarone/indene resin described in Example 7, polystyrene (having a specific gravity at 20° C. of 1.06, a refractive index at 20° C. of 1.60, a melting point of 100° C. as determined by the ball and ring method, and sold by the Pennsylvania Industrial Chemical Corporation), and ethyl cellulose (having a melting point range of 160 to 179° C., a softening point range of 138 to 148° C., a viscosity determined at 25° C. using a 5% by weight solution of ethyl cellulose in an 80–20 toluene-ethanol solvent of 45–55 centipoises, and sold by the Dow Chemical Company) as shown in Table V. Splices made from these adhesives were evaluated as in Example 6. Tensile strength measurements at 75° F. showed the splice made from the adhesive having the polystyrene component had a tensile strength of 53 pounds and the splice made from the adhesive having the ethyl cellulose component had a tensile strength of 54 pounds. Additional results are shown in Table V.

Table V

| Copolyester,[1] percent by weight | Adjuvant,[1] percent by weight | Percent Solids in Methylene Chloride Solvent | 75° F. Peel Strength (lb.) | 122° F. Creep Resistance (min.) |
|---|---|---|---|---|
| 50 | Coumarone/indene—50% | 40 | 4.9 | 4.6 |
| 50 | Polystyrene—50% | 50 | 5.1 | 2.8 |
| 84 | Ethyl cellulose—16% | Solid | 8.9 | 0.5 |

[1] Based on the total weight of the copolyester plus adjuvant.

EXAMPLE 9

The adhesive copolyester of Example 7 (10 parts by weight), a coumarone/indene resin as described in Example 7 (9 parts by weight) finely divided silica, 10–20 millimicrons in diameter (1 part by weight), o-phenylphenol (0.2% by weight) and toluene diisocyanate (0.1% by weight) were admixed in methylene chloride (40% solids). The resulting solution was used to splice one unscraped polyethylene terephthalate photographic film to a cellulose triacetate photographic film by the method described in Example 6. Peel strength as determined in the manner described in Example 1 was 7.0 pounds at 75° F.

A copolyester having the same composition but with 0.15% pentaerythritol added as a crosslinking agent was used to splice two unscraped polyethylene terephthalate photographic films and was tested as indicated in Example 5. The tensile strength at 75° F. was 42 pounds, the peel strength at 75° F. was 10.1 pounds and at 60° F. was 14.3 pounds, and the creep resistance at 122° F. was 1.8 minutes.

EXAMPLE 10

Four adhesive compositions were prepared from the copolyester indicated in Example 7 and, respectively, (1) a heat hardening phenol/formaldehyde resin designated BR–10282 (which is oil soluble, has a melting point of 180–210° F. determined by the ball and ring method, and is sold by the Bakelite Division of Union Carbide and Carbon Corporation), (2) a heat hardening phenol/formaldehyde resin designated Synvarite POS–55S (having a melting point of 85–95% C. determined by the ball and ring method, a specific gravity of 1.10–1.15, and sold by Synvar Corporation), (3) BR–10282 plus cellulose acetate, and (4) BR–10282 plus ethyl cellulose (described in Example 8), in methylene chloride (40% solids) as shown in Table VI. Splices were prepared as indicated in Example 6 from this adhesive and the following results obtained.

Table VI

| Copolyester,[1] percent by weight | Adjuvant,[1] percent by weight | 75° F. Peel Strength (lb.) | 50° F. Peel Strength (lb.) | 75° F. Tensil Strength (lb.) | 122° F. Creep Resistance (min.) |
|---|---|---|---|---|---|
| 60 | BR–10282—40% | 7.7 | 4.4 | | 1.4 |
| 50 | Synvarite POS–55S—50% | 4.6 | | 70 | 10÷ |
| 37 | Cellulose Acetate—13%; BR–10282—50% | 6.1 | 1.9 | 53 | 20÷ |
| 46 | Ethyl Cellulose—4%; BR–10282—50% | | 1.3 (60° F.) | | 4.9 |

[1] Based on total weight of copolyester plus adjuvant.

EXAMPLE 11

A copolyester of the composition indicated in Example 7, except that 0.15 mole of pentaerythritol was added during polymerization, was mixed with the heat hardening phenol/formaldehyde resin BR–10282 described in Example 10. A second adhesive composition was made in the same way, except that substituted for the BR–10282 resin was a heat hardening phenol/formaldehyde resin, BR–14634 (which is oil soluble, has a melting point of 190–215° F. as determined by the ball and ring method, and is sold by the Bakelite Division of Union Carbide and Carbon Corporation). The adhesive compositions were dissolved in acetone, and evaluated as in Example 6. The results are set forth in Table VII.

*Table VII*

| Copolyester,[1] percent by weight | Adjuvant,[1] percent by weight | Percent Solids in Acetone Solvent | 75° F. Peel Strength (lb.) | 50° F. Peel Strength (lb.) | 122° F. Creep Resistance (min.) |
|---|---|---|---|---|---|
| 50 | BR–10282—50% | 40 | 5.5 | 3.3 | 10÷ |
| 60 | BR–14634—40% | 40 | 6.4 | 5.5 | 1.4 |

[1] Based on total weight of copolyester plus adjuvant.

EXAMPLE 12

A copolyester was prepared as described in Example 1 but having the dialkyl ester components respectively in a mole ratio of 3:1:1. To 52 parts by weight of the copolyester was added 26 parts by weight of the coumarone/indene resin described in Example 7 and 22 parts by weight of the p-phenylphenol/formaldehyde resin described in Example 2. The mixture was dissolved in methylene chloride (46% solids). Evaluation as in Example 6 showed the tensile strength at 75° F. was 62 pounds, peel strength at 75° F. was 10.5 pounds, and the creep resistance at 122° F. was 7.9 minutes.

EXAMPLE 13

Four parts of the copolyester and 4 parts of the coumarone/indene resin described in Example 12 were mixed with 2 parts of magnesium oxide. The mixture was dissolved in methylene chloride (45% solids). A splice prepared and tested as in Example 6 had a 5.3 pound peel strength at 75° F. and a creep resistance of 6.5 minutes at 122° F.

This example was repeated substituting finely divided silica with particles approximately 10–20 millimicrons in diameter in place of the magnesium oxide. The resultant splice prepared and tested as in Example 6 had a 6.4 pound peel strength at 75° F. and a 11.1 minute creep resistance at 122° F.

EXAMPLE 14

Six parts of a copolyester, prepared as described in Example 1 but having the dialkyl ester components respectively in the mole ratio of 2:9:9, were mixed with 4 parts of the p-phenylphenol/formaldehyde resin described in Example 2. The mixture was dissolved in methylene chloride (67%). The adhesive was evaluated as in Example 6 and the following results were obtained:

Peel strength, 75° F. (lb.) _____ 8.1
Peel strength, 58° F. (lb.) _____ 3.5
Creep resistance, 122° F. (min.) _____ 0.3

EXAMPLE 15

To a solution of 3.75 gm. of the copolyester described in Example 1, and 1.25 gm. of the p-phenylphenol/formaldehyde resin described in Example 2, in 66.8 gm. of methylene chloride, were added 1.0 gm. of the silica described in Example 12, and 1.0 gm. of an estersil 8–10 millimicrons in diameter described in Iler U.S. 2,657,149, the estersil being wetter with 1.3 gm. methylene chloride. The mixture was ball milled for two days using ceramic beads and then cast to a depth of 27 mils on a polytetrafluoroethylene resin sheet held flat on a glass support by vacuum. Evaporation of the solvent during a two day period resulted in a non-tacky, somewhat elastic layer about 7–8 mils thick. The layer was further conditioned for about eight hours at 122° F. and then stripped as a self-supporting tape or film from the polytetrafluoroethylene sheet and cut to fit a 1.375 inch by 0.030 inch overlap area. The cut tape of the adhesive composition was placed between the overlap areas, as described above, of two photographic films having bases of polyethylene terephthalate. The emulsion layer had been scraped from the lower polyethylene terephthalate film. A sandwich was formed and the splice heated for 1–2 seconds in a photographic film splicing instrument known as the Shepard Electronic Splicer and manufactured by the Neumade Products Corporation of New York, New York. A satisfactory splice was obtained.

This example was repeated, except that a scraped cellulose triacetate photographic film was substituted for the scraped polyethylene terephthalate film, with similar satisfactory results. This example was again repeated using one scraped cellulose triacetate photographic film as the lower photographic film and one unscraped cellulose triacetate film as the upper layer of the sandwich in place of the two polyethylene terephthalate films. Satisfactory re-results were again similarly obtained.

EXAMPLE 16

To a solution of 3.75 gm. of the copolyester described in Example 1 but having the dialkyl ester components respectively in the mole ratio of 8:1:1, and 1.25 gm. of the p-phenylphenol/formaldehyde resin described in Example 2, in 40 gm. of methylene chloride, was added 1.5 gm. of the silica described in Example 12. The mixture was ball milled for three days using ceramic beads and then cast to a depth of 33 mils on a polytetrafluoroethylene resin sheet in the manner described in Example 15. A non-tacky somewhat brittle layer, 6 mils thick, of the adhesive composition was obtained after the solvent had been allowed to evaporate for two days. The layer was further conditioned, stripped as a self-supporting tape or film from the polytetrafluoroethylene resin sheet, cut to size and made into sandwich splices as described in Example 15. Satisfactory splices were obtained.

Actual projector runs can be performed to verify the splice strength tests of the foregoing examples using film containing splices made with the adhesive described herein.

Also, following the procedures illustrated in the foregoing examples, this invention can be carried out substituting for the indicated figures and ingredients other figures and ingredients within the scope of the appended claims.

Illustrative of glycols (having from 2 to 10 carbon atoms and 0 to 4 oxygen atoms in addition to the hydroxyl groups) suitable as a component of the copolyester according to this invention can be mentioned the following: 1,2-ethanediol, 1,2-propanediol, 1,3-propanediol, 1,2-butanediol, 1,3-butanediol, 1,4-butanediol, 1,2-pentanediol, 2,3-pentanediol, 2,4-pentanediol, 1,5-pentanediol, 1,2-hexanediol, 2,3-hexanediol, 3,4-hexanediol, 1,6-hexanediol, 1,2-heptanediol, 1,2-octanedioll, 1,2-nonanediol, 1,2-decanediol, 2-methylpropane-1,3-diol, 2,2-dimethylpropane-1,3-diol, 2,2-diethylpropane-1,3-diol, 2-methoxymethyl-2,4-dimethylpentane-1,5-diol, 2-ethylhexane-1,3-diol, diethylene glycol, triethylene glycol, dipropylene glycol, tripropylene glycol, tetraethylene glycol, pentaethylene glycol, 1,2-cyclopentanediol, 1,3-cyclopentanediol, 1,2-cyclohexanediol, 1,3-cyclohexanediol, etc.

As will be understood, cross-linking agents can be added if desired to the copolyester during preparation. Suitable cross linking agents include diisocyanates, peroxides, pentaerythritol glycerol (polyfunctional glycol), etc.

Solvents useful in the liquid adhesive embodiment of this invention include ethers, such as tetrahydrofuran, diethyl ether, and dioxane; esters, such as methyl acetate, methyl formate, ethyl acetate, and ethyl formate; ketones, such as acetone, cyclohexanone, and methyl ethyl ketone; halogenated hydrocarbons, such as methylene chloride, chloroform, and trichlorotrifluoroethane; and nitrated hydrocarbons such as nitromethane and nitroethane.

Saturated aliphatic dicarboxylic acids represented by the formula $HOOC(CH_2)_nCOOH$ within the scope of this invention include adipic, pimelic, suberic, azelaic, and sebacic acids.

Suitable fillers which can be added to the adhesive compositions of this invention include silica, magnesium oxide, magnesium silicate, calcium silicate, zinc oxide, lead oxide (litharge), barium sulfate, clay, chalk, mica, carbon black, and protein meal.

Suitable plasticizers which can be used include tricresyl phosphate, dibutyl phthalate, dioctyl phthalate, diethyl phthalate, trioctyl phosphate, triphenyl phosphate, tributoxyethyl phosphate, dioctyl sebacate, dioctyl azelate, dioctyl adipate, and methyl penta chlorostearate. When adhesive composition is in the form of a monofilament or ribbon, in addition to the non-sticking coating materials disclosed above, suitable such materials include talc, colloidal silica, p-phenylphenol/formaldehyde resin applied as a powder, magnesium and calcium silicate, zinc oxide, lead (litharge) oxide, barium sulfate, clay, chalk, mica, and carbon black.

When the adhesive is used in tape form to splice film, the splices can be made with the film ends to be joined in abutting relationship or in overlapping relationship, as will be understood in the art.

A particular outstanding advantage of the adhesive compositions of this invention is that they can be used to splice films and materials of the same or different compositions, including an extremely wide variety of compositions. Such splices can be made under controlled temperatures whether the films are uncoated or coated with various materials, such as gelatin emulsions, polyvinyl alcohol, other sublayers, etc., as long as the decomposition temperature of the coating or film is not attained. A specific advantage of this invention is that it is the first nontoxic multi-purpose splicing adhesive for motion picture film which can effectively be used in splicing of polyethylene terephthalate motion picture film to another motion picture film of the same or different material.

The invention claimed is:

1. An article of manufacture comprising a flexible, non-fibrous photographic film base material selected from the group consisting of polyethylene terephthalate, cellulose acetate, cellulose triacetate, cellulose nitrate and polystyrene having on at least one surface a thin layer of an adhesive composition which comprises as an essential ingredient a linear copolyester corresponding to the esterification product of (1) hexahydroterephthalic acid in an amount within the range from 10 to 90 mole percent of the copolyester, (2) a saturated aliphatic carboxylic acid represented by the formula $HOOC(CH_2)_nCOOH$ where $n$ is an integer from 4 through 8 inclusive, in an amount within the range from 5 to 45 mole percent of the copolyester, (3) an aromatic dicarboxylic acid from the group consisting of terephthalic acid and isophthalic acid, in an amount within the range from 5 to 45 mole percent of the copolyester, and (4) a glycol taken from the group consisting of unsubstituted glycols of 2 to 10 carbon atoms and unsubstituted polyglycols of 2 to 10 carbon atoms and 1 to 4 intralinear oxygen atoms.

2. The article as set forth in claim 1 wherein said adhesive composition contains about 25% by weight of an additional thermoplastic polymeric material and finely divided silica having an average particle size of about 10 to 20 millimicrons in diameter in an amount of up to about 30% by weight of the total weight of the thermoplastic polymeric components of said adhesive.

3. The method of splicing flexible, non-fibrous photographic film bases selected from the group consisting of polyethylene terephthalate, cellulose acetate, cellulose triacetate, cellulose nitrate and polystyrene which comprises placing the following adhesive composition between two film surfaces to be spliced:

an adhesive composition comprising as an essential ingredient a linear copolyester corresponding to the esterification product of (1) hexahydroterephthalic acid in an amount within the range from 10 to 90 mole percent of the copolyester, (2) a saturated aliphatic carboxylic acid represented by the formula $HOOC(CH_2)_nCOOH$ where $n$ is an integer from 4 through 8 inclusive, in an amount within the range from 5 to 45 mole percent of the copolyester, (3) an aromatic dicarboxylic acid from the group consisting of terephthalic acid and isophthalic acid, in an amount within the range from 5 to 45 mole percent of the copolyester, and (4) a glycol taken from the group consisting of unsubstituted glycols of 2 to 10 carbon atoms and unsubstituted polyglycols of 2 to 10 carbon atoms and 1 to 4 intralinear oxygen atoms;

and heating said adhesive composition from two to fifteen seconds at a temperature within the range from about 140° to about 175° C. under sufficient pressure to distribute the adhesive.

4. A liquid adhesive composition comprising about a 60% by weight solution in methylene chloride of a mixture of (1) about 65% by weight of a copolyester of ethylene glycol and hexahydroterephthalic acid in an amount of about 20 mole percent, sebacic acid in an amount of about 40 mole percent, and terephthalic acid in an amount of about 40 mole percent, and (2) about 35% by weight of a non-heat hardening p-phenylphenol/formaldehyde resin.

References Cited in the file of this patent

UNITED STATES PATENTS

| 2,465,319 | Whinfield et al. | Mar. 22, 1949 |
| 2,615,784 | McClellan | Oct. 28, 1952 |
| 2,621,706 | Jirouch | Dec. 16, 1952 |
| 2,673,826 | Ness | Mar. 30, 1954 |
| 2,683,100 | Edgar et al. | July 6, 1954 |
| 2,719,100 | Banigan | Sept. 27, 1955 |
| 2,742,494 | Mraz | Apr. 17, 1956 |
| 2,764,502 | Emerson | Sept. 25, 1956 |
| 2,765,251 | Williams | Oct. 2, 1956 |
| 2,819,247 | Lundberg | Jan. 7, 1958 |
| 2,820,735 | Amborski | Jan. 21, 1958 |
| 2,836,576 | Piccard et al. | May 27, 1958 |
| 2,840,538 | Minter et al. | June 24, 1958 |
| 2,849,359 | Smith | Aug. 26, 1958 |
| 2,852,487 | Maker | Sept. 16, 1958 |
| 2,865,765 | Allen | Dec. 23, 1958 |
| 2,892,747 | Dye | June 30, 1959 |

FOREIGN PATENTS

| 465,383 | Canada | May 23, 1950 |
| 483,236 | Canada | May 13, 1952 |